(12) United States Patent
Johansson et al.

(10) Patent No.: US 12,227,974 B2
(45) Date of Patent: Feb. 18, 2025

(54) VEHICLE DOOR SYSTEM, A VEHICLE COMPRISING THE VEHICLE DOOR SYSTEM, AND A METHOD FOR OPERATING A VEHICLE DOOR SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Jonathan Johansson, Gothenburg (SE); Magnus Nilsson, Floda (SE)

(73) Assignees: Ningbo Geely Automobile Research & Development Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 38 days.

(21) Appl. No.: 18/071,446

(22) Filed: Nov. 29, 2022

(65) Prior Publication Data

US 2023/0116438 A1 Apr. 13, 2023

Related U.S. Application Data

(63) Continuation of application No. PCT/CN2021/113155, filed on Aug. 18, 2021.

(30) Foreign Application Priority Data

Aug. 28, 2020 (EP) ...................................... 20193291

(51) Int. Cl.
*E05C 17/38* (2006.01)
*B60J 5/04* (2006.01)

(52) U.S. Cl.
CPC ............... *E05C 17/38* (2013.01); *B60J 5/047* (2013.01)

(58) Field of Classification Search
CPC ........ E05C 17/38; E05C 17/28; E05C 17/203; E05C 17/20; E05C 17/18; E05D 65/06
See application file for complete search history.

(56) References Cited

U.S. PATENT DOCUMENTS

| 1,714,950 | A | * | 5/1929 | Earhart | ................. | E05C 17/203 |
| | | | | | | 16/85 |
| 4,460,105 | A | * | 7/1984 | Cox | ........................ | E05C 17/38 |
| | | | | | | 217/60 C |

(Continued)

FOREIGN PATENT DOCUMENTS

| CN | 202965905 U | 6/2013 |
| CN | 104746980 A | 7/2015 |

(Continued)

OTHER PUBLICATIONS

International Search Report of corresponding International Application No. PCT/CN2021/113155, dated Nov. 17, 2021, 3 pages.

*Primary Examiner* — Marcus Menezes
(74) *Attorney, Agent, or Firm* — Tucker Ellis LLP

(57) ABSTRACT

A vehicle door system for limiting an opening angle. The system includes a track connected to the door, a clamp unit connected to and movable in relation to the track, and a blocking member connected to a vehicle body structure. The track extends through the blocking member. In a first state, the clamp unit is moveable in relation to the track and, in a second state, the clamp unit is prevented from moving in relation to the track. In the first state when the door is opened the clamp unit moves along the track. When the door, in the open position, is at a predetermined angle, the clamp unit is at a locked position in relation to the track preventing further opening of the vehicle door through interaction between the clamp unit and the blocking member.

14 Claims, 6 Drawing Sheets

(56) References Cited

U.S. PATENT DOCUMENTS

| | | | |
|---|---|---|---|
| 6,744,365 B2* | 6/2004 | Sicuranza | E05C 17/00 |
| | | | 250/221 |
| 2003/0163895 A1* | 9/2003 | Liang | E05C 17/203 |
| | | | 16/82 |
| 2004/0111832 A1* | 6/2004 | Murayama | E05C 17/203 |
| | | | 16/82 |
| 2005/0085972 A1 | 4/2005 | Martinez | |
| 2008/0120911 A1* | 5/2008 | Browne | E05F 15/60 |
| | | | 49/352 |
| 2017/0114578 A1* | 4/2017 | Freedman | E05C 17/203 |
| 2017/0284142 A1* | 10/2017 | Jaranson | E05F 1/1008 |
| 2019/0100950 A1 | 4/2019 | Aravkin et al. | |

FOREIGN PATENT DOCUMENTS

| | | |
|---|---|---|
| CN | 204531755 U | 8/2015 |
| CN | 204956043 U | 1/2016 |
| CN | 108150032 A | 6/2018 |
| CN | 110316057 A | 10/2019 |
| DE | 10 2016 004 792 A1 | 10/2017 |
| DE | 10 2016 006 323 A1 | 11/2017 |
| DE | 10 2018 125 846 A1 | 4/2020 |
| EP | 3839182 A1 | 6/2021 |
| JP | 2003-172059 A | 6/2003 |

\* cited by examiner

VEHICLE DOOR SYSTEM, A VEHICLE COMPRISING THE VEHICLE DOOR SYSTEM, AND A METHOD FOR OPERATING A VEHICLE DOOR SYSTEM

RELATED APPLICATION DATA

This application is a continuation of International Patent Application No. PCT/CN2021/113155, filed Aug. 18, 2021, which claims the benefit of European Patent Application No. 20193291.0, filed Aug. 28, 2020, the disclosures of which are incorporated herein by reference in their entireties.

TECHNICAL FIELD

The present disclosure relates to a vehicle door system for limiting an opening angle of a vehicle door. The vehicle door is attached to and movably arranged in relation to a vehicle body structure between a closed door position and an open door position. The disclosure further relates to a vehicle comprising the vehicle door system, and a method for operating a vehicle door system.

BACKGROUND

Vehicle doors are commonly attached to and movably arranged in relation to a vehicle body structure between a closed door position and an open door position through a swinging movement. When opening a vehicle door in narrow spaces it is sometimes difficult to avoid that the door is hitting adjacent objects, such as for example a nearby-parked vehicle, a lamp post, a barrier, or a wall, and may especially be of concern if a child is opening the vehicle door. This may cause unwanted damage to the vehicle door and/or or to the adjacent object. It is known in the art to attach a protective device, such as a door bumper or bumper guard, on the vehicle door for minimizing the damage to the vehicle door and/or to the adjacent object. However, these protective devices are often aesthetically unattractive and non-efficient to use, since they are only protecting a limited part of the vehicle door.

There is thus a need for an improved way of efficiently preventing vehicle doors from hitting adjacent objects when displaced between closed and open door positions.

SUMMARY

An object of the present disclosure is to provide a vehicle door system, a vehicle comprising the vehicle door system, and a method for operating a vehicle door system where the previously mentioned problems are avoided. This object is at least partly achieved by the features of the independent claims. The dependent claims contain further developments of the vehicle door system and the method for operating a vehicle door system.

The disclosure concerns a vehicle door system for limiting an opening angle of a vehicle door, where the vehicle door is attached to and movably arranged in relation to a vehicle body structure between a closed door position and an open door position. The system comprises a track configured for being connected to the vehicle door, a clamp unit connected to and movably arranged in relation to the track, and a blocking member connected to the vehicle body structure. The track is extending through the blocking member. The clamp unit is configured for being arranged in a first state where the clamp unit is allowed to move in relation to the track and a second state where the clamp unit is prevented from moving in relation to the track. In the first state when the vehicle door is moved from the closed door position to the open door position the clamp unit is configured for moving along the track. When the vehicle door in the open door position is positioned in a predetermined opening angle position, the clamp unit is configured for being arranged in the second state at a locked position in relation to the track preventing further opening of the vehicle door through interaction between the clamp unit and the blocking member.

Advantages with these features are that when opening the vehicle door in narrow spaces the vehicle door can be prevented from hitting adjacent objects, through the arrangement with the clamp unit locked to the track. The track is moving with the vehicle door when being opened and the clamp unit is efficiently preventing further opening of the vehicle door in the second state where the clamp unit is prevented from moving in relation to the track. In this way, unwanted damage to the vehicle door and/or to the adjacent objects can be avoided. The vehicle door system is also providing a solution where the vehicle door is possible to close freely at any time. In the first state, the clamp unit is allowed to move in relation to the track for an efficient door opening operation and positioning of the clamp unit in relation to the track. With the system, there is no need for using protective devices, such as a door bumpers or bumper guards, on the vehicle door for minimizing the damage to the vehicle door and/or to the adjacent object.

According to an aspect of the disclosure, in the second state, the vehicle door is configured for being movable between the predetermined opening angle position and the closed door position. This is allowing a repeated opening and closing of the vehicle door between the predetermined opening angle and closed door positions, without hitting the adjacent objects.

According to another aspect of the disclosure, in the first state the clamp unit is configured for being moved along the track through interaction between the clamp unit and the blocking member when the vehicle door is moved from the closed door position to the open door position. The clamp unit is thus arranged to interact with the blocking member for positioning the clamp unit in relation to the track, and when opening the vehicle door the clamp unit is efficiently displaced along the track, for example by a pushing action, through the interaction with the blocking member.

According to an aspect of the disclosure, the system further comprises a detection unit configured for determining the predetermined opening angle position based upon distance detection of adjacent objects. The detection unit is used for detecting the distances to the adjacent objects, and based on the detected distances the opening angle of the vehicle door can be calculated. The predetermined opening angle position is determined as an opening angle of the vehicle door where the vehicle door is prevented from hitting the adjacent objects.

According to another aspect of the disclosure, the vehicle door is arranged in a lateral vehicle direction on an outer vehicle side in relation to the blocking member, and the clamp unit is arranged in the lateral vehicle direction on an inner vehicle side in relation to the blocking member. The vehicle door and the clamp unit are arranged on opposite sides of the blocking member in the lateral vehicle direction. With this arrangement, the clamp unit can be efficiently displaced through interaction with the blocking member when the vehicle door is opened, and when the clamping unit is locked to the track the blocking member is efficiently preventing further opening of the vehicle door through interaction with the clamp unit.

According to a further aspect of the disclosure, the blocking member comprises an opening, and the track is configured for extending through the opening. The opening is establishing an efficient and compact design of the system, where the interaction between the blocking member and the clamp unit is simplified.

According to an aspect of the disclosure, the system further comprises a spring arrangement connected to and arranged between the clamp unit and the blocking member. The spring arrangement is configured for positioning the clamp unit in connection to the blocking member in the first state. In the first state, where the clamp unit is allowed to move in relation to the track the spring arrangement is holding the clamp unit in connection to the blocking member for a precise positioning of the clamp unit in relation to the track. The spring arrangement is further used for positioning the clamp unit in connection to the blocking member when the system is rearranged in the first state after a locking engagement between the clamp unit and the track in the second state.

According to another aspect of the disclosure, in the first state the clamp unit is configured for being moved along the track by the spring arrangement when the vehicle door is moved from the open door position to the closed door position. The spring arrangement is in this way configured to arrange the clamp unit in connection to the blocking member in the first state when the track is moving in relation to the blocking member when closing the vehicle door. The clamp member is thus when closing the vehicle door in the first state displaced in relation to the track.

According to a further aspect of the disclosure, the clamp unit comprises an actuator, where the actuator is configured for locking the clamp unit to the track. The actuator is used for locking the clamp unit to the track in a desired position when opening the vehicle door for preventing further movement of the vehicle door in order to avoid hitting adjacent objects.

According to an aspect of the disclosure, the actuator comprises a movably arranged locking member and the track comprises a plurality of locking openings. The locking member is configured for being in locking engagement with one of the locking openings in the second state. The locking member is designed for efficiently engaging one of the locking openings of the track in a desired position. The plurality of locking openings are allowing the clamp unit to be arranged in different positions along the track depending on the predetermined opening angle position of the vehicle door.

According to another aspect of the disclosure, the vehicle door is configured for being arranged in connection to the blocking member in the closed door position and arranged at a distance from the blocking member in the open door position. The track is configured to move with the vehicle door when positioned between the closed door position and the open door position.

According to a further aspect of the disclosure, the track has a curved configuration. The curved configuration is allowing an efficient displacement of the track in relation to the blocking member.

The disclosure further concerns a vehicle comprising the vehicle door system described above.

The disclosure further concerns a method for operating a vehicle door system of a vehicle for limiting an opening angle of a vehicle door. The vehicle door is attached to and movably arranged in relation to a vehicle body structure of the vehicle between a closed door position and an open door position. The system comprises a track configured for being connected to the vehicle door, a clamp unit connected to and movably arranged in relation to the track, and a blocking member connected to the vehicle body structure. The track is extending through the blocking member. The method comprises the steps: arranging the clamp unit in a first state where the clamp unit is allowed to move in relation to the track; moving the vehicle door when the clamp unit is arranged in the first state from the closed door position to the open door position, where during movement of the vehicle door the clamp unit is moving along the track; arranging the clamp unit in a second state where the clamp unit is prevented from moving in relation to the track at a locked position of the clamp unit in relation to the track, when the vehicle door in the open door position is positioned in a predetermined opening angle position, where further opening of the vehicle door is prevented through interaction between the clamp unit and the blocking member.

Advantages with these features are that when opening the vehicle door in narrow spaces the vehicle door can be prevented from hitting adjacent objects, through the locking arrangement of the clamp unit to the track. The track is moving with the vehicle door when being opened and the clamp unit is efficiently preventing further opening of the vehicle door in the second state where the clamp unit is prevented from moving in relation to the track. In the first state, the clamp unit is allowed to move in relation to the track for an efficient door opening operation and positioning of the clamp unit in relation to the track. Unwanted damage to the vehicle door and/or to the adjacent objects can be avoided.

According to an aspect of the disclosure, the system further comprises a detection unit. The method further comprises the steps: detecting distances from the vehicle to adjacent objects with the detection unit; and based on the detected distances determining the predetermined opening angle position. The detection unit is detecting the distances to the adjacent objects, and based on the detected distances the opening angle of the vehicle door can be calculated. The predetermined opening angle position is determined as an opening angle of the vehicle door where the vehicle door is prevented from hitting the adjacent objects.

According to another aspect of the disclosure, the method further comprises the step: moving the clamp unit in relation to the track in the first state through interaction between the clamp unit and the blocking member when the vehicle door is moved from the closed door position to the open door position. The clamp unit is interacting with the blocking member for positioning the clamp unit in relation to the track, and when opening the vehicle door the clamp unit is efficiently displaced along the track by the interaction with the blocking member.

According to a further aspect of the disclosure, the system further comprises a spring arrangement connected to and arranged between the clamp unit and the blocking member. The method further comprises the steps: positioning the clamp unit in connection to the blocking member in the first state with the spring arrangement, and moving the clamp unit in relation to the track in the first state by the spring arrangement when the vehicle door is moved from the open door position to the closed door position. In the first state, the clamp unit is moving in relation to the track and the spring arrangement is holding the clamp unit in connection to the blocking member for positioning the clamp unit in relation to the track. The spring arrangement is further used for positioning the clamp unit in connection to the blocking member when the system is rearranged in the first state after a locking engagement between the clamp unit and the track in the second state.

According to an aspect of the disclosure, the clamp unit comprises an actuator. The method further comprises the step: locking the clamp unit to the track with the actuator in the second state. The actuator is locking the clamp unit to the track in a desired position when opening the vehicle door for preventing further movement of the vehicle door.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
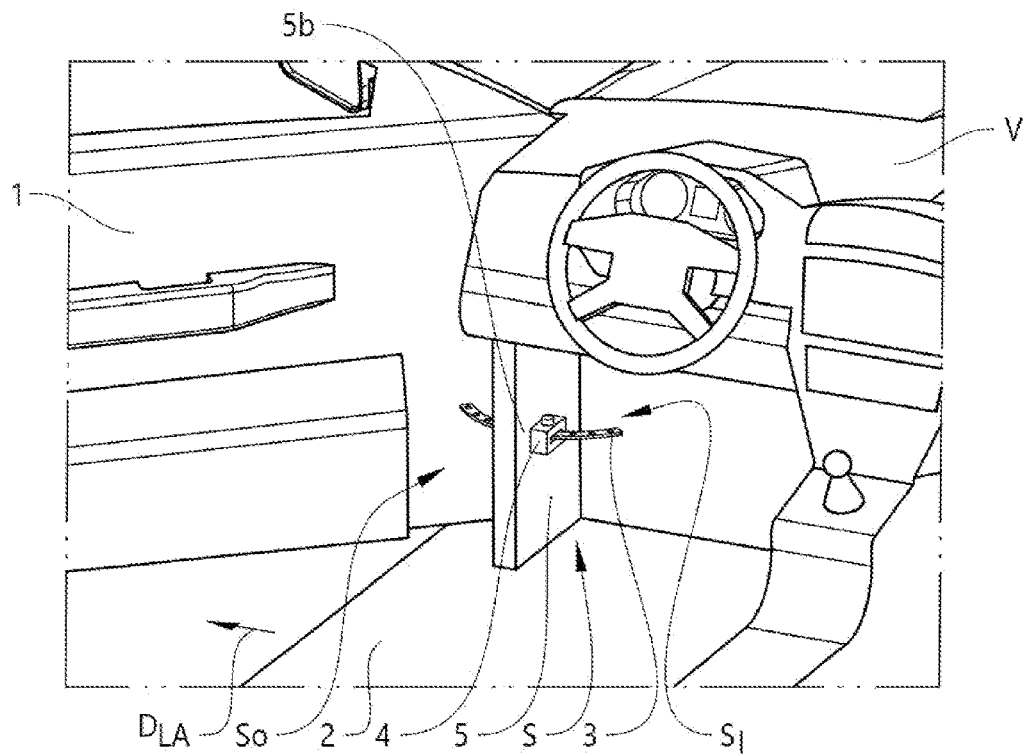
FIG. 1 shows schematically, in a perspective view a vehicle door system for limiting an opening angle of a vehicle door, according to the disclosure.
Figure 2:
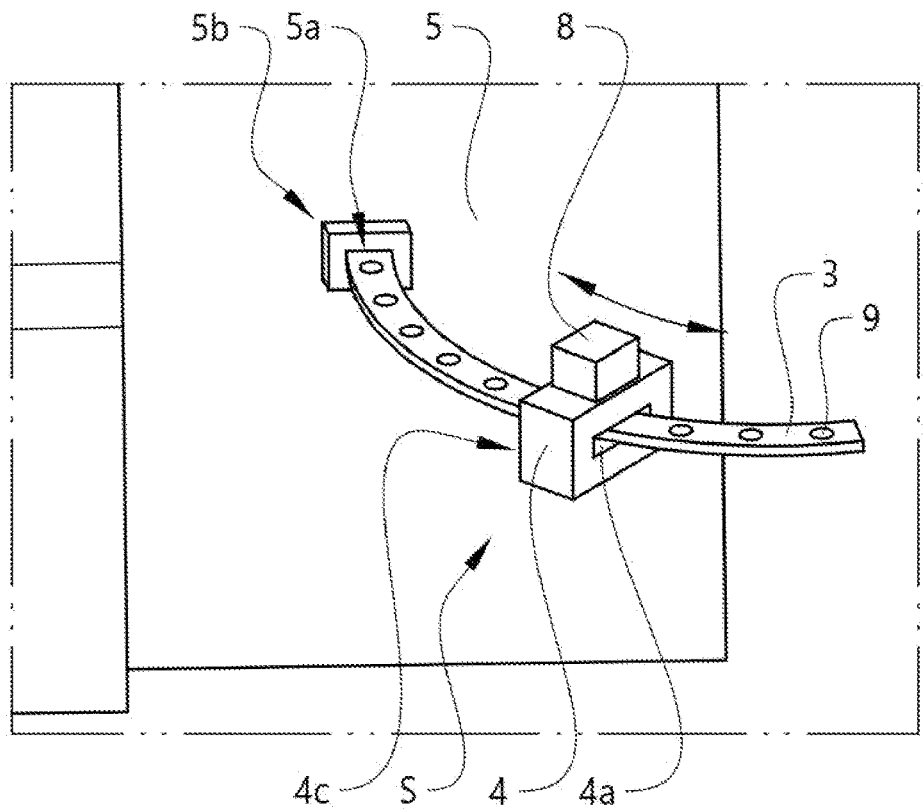
FIG. 2 shows schematically, in an enlarged perspective view the vehicle door system, according to the disclosure.

FIGS. 1-2 schematically shows a vehicle door system S for a vehicle V, where the system S is limiting an opening angle $\alpha$ of a vehicle door 1 according to the disclosure. The vehicle V comprises the vehicle door system S, and the vehicle door 1 is in a traditional way attached to and movably arranged in relation to a vehicle body structure 2, as schematically shown in FIGS. 4-10, between a closed door position $P_C$ and an open door position $P_O$. The vehicle body structure 2 has an extension in a longitudinal vehicle direction $D_{LO}$ and a lateral vehicle direction $D_{LA}$, as schematically shown in FIGS. 4-10, also defining the directions of the vehicle door system S. The vehicle door system S comprises a track 3 that is connected to the vehicle door 1, a clamp unit 4 connected to and movably arranged in relation to the track 3, and a blocking member 5 connected to the vehicle body structure 2. As further illustrated, the track 3 is extending through the blocking member 5, and the track 3 is allowed to move in relation to the blocking member 5 unless prevented from movement by the clamp unit 4 as will be further described below. The track 3 may be attached to the vehicle door 1 with any suitable attachments means, such as for example welds, screw fasteners, or rivets. As shown in FIG. 1, the track 3 is suitably connected to the vehicle door 1 at a position close to a side edge of the vehicle door 1, where the vehicle door 1 is hingedly attached to the vehicle body structure 2. The vehicle door 1 may be hingedly attached to the vehicle body structure 2 with any suitable hinge arrangements for an efficient opening and closing of the vehicle door 1. The track 3 may for example be made of steel, aluminium, other metals or metallic materials, plastic materials, composite materials, or a combination of different materials. The track 3 has a curved configuration as shown in the figures. The curved configuration is allowing an efficient displacement of the track 3 in relation to the blocking member 5 when moving the vehicle door 1. The curved configuration of the track 3 may for example be arranged as a circle-section onto which the clamp unit 4 is arranged. The vehicle door system S may be operated in connection to one or more of the vehicle doors, and in the figures, a front left vehicle door 1 is shown to illustrate the system S.

The closed door position $P_C$ is schematically illustrated in FIGS. 4, 7, 8, and 9. The open door position $P_O$ is schematically illustrated in FIGS. 5, 6, and 10. The open door position $P_O$ is defined as any position where the vehicle door 1 is angularly displaced outwards in the lateral vehicle direction $D_{LA}$ from the closed door position $P_C$. In the closed door position $P_C$, the vehicle door 1 has no opening angle $\alpha$, which is corresponding to an opening angle $\alpha$ of 0°. In the open door position $P_O$, the vehicle door 1 has an opening angle $\alpha$ that is greater than 0°. The opening angle is thus describing the angular displacement of the vehicle door 1 from the closed position, as schematically shown in FIG. 6. The maximum opening angle $\alpha$ may vary depending on the construction and design of the vehicle V.

Figure 4:
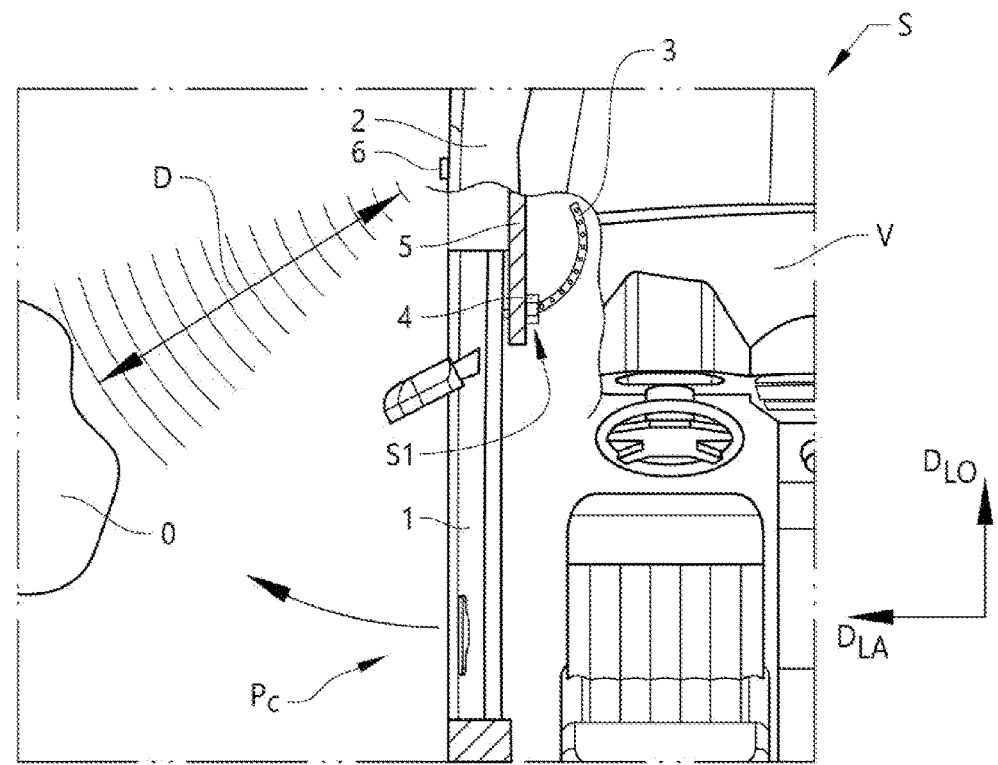
FIG. 4 shows schematically, in a view from above a vehicle with the vehicle door system in the first state with a closed vehicle door, according to the disclosure.
Figure 5:
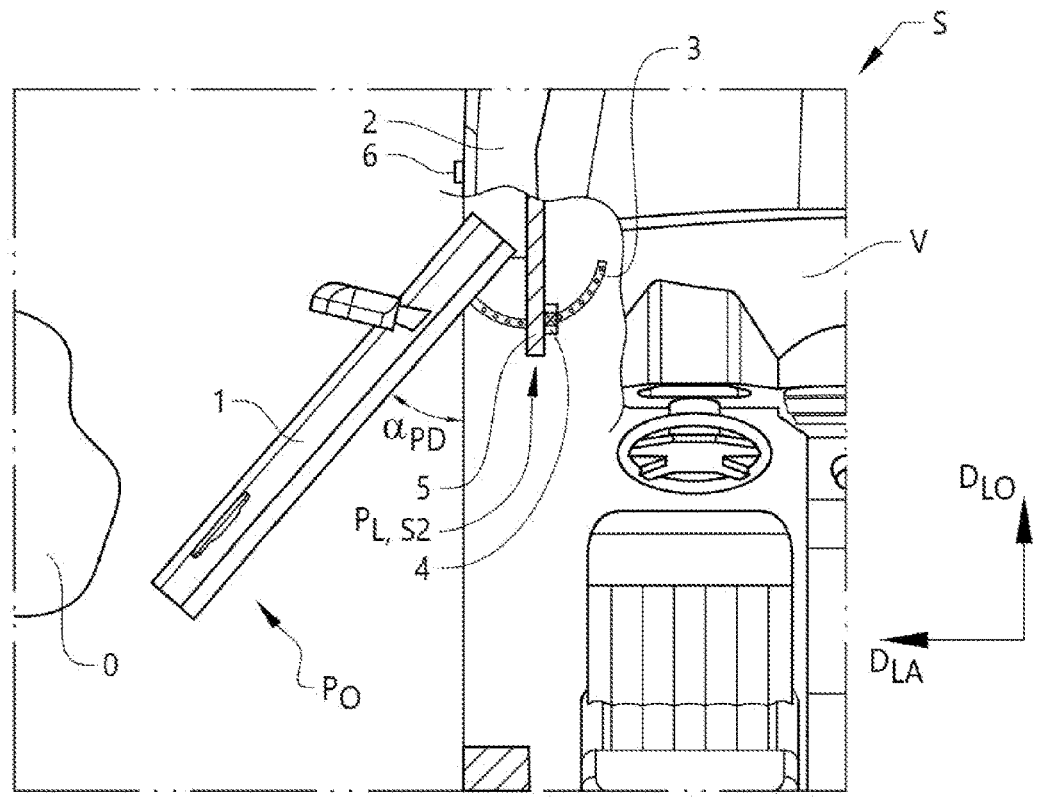
FIG. 5 shows schematically, in a view from above the vehicle with the vehicle door system in the second state with an open vehicle door, according to the disclosure.
Figure 6:
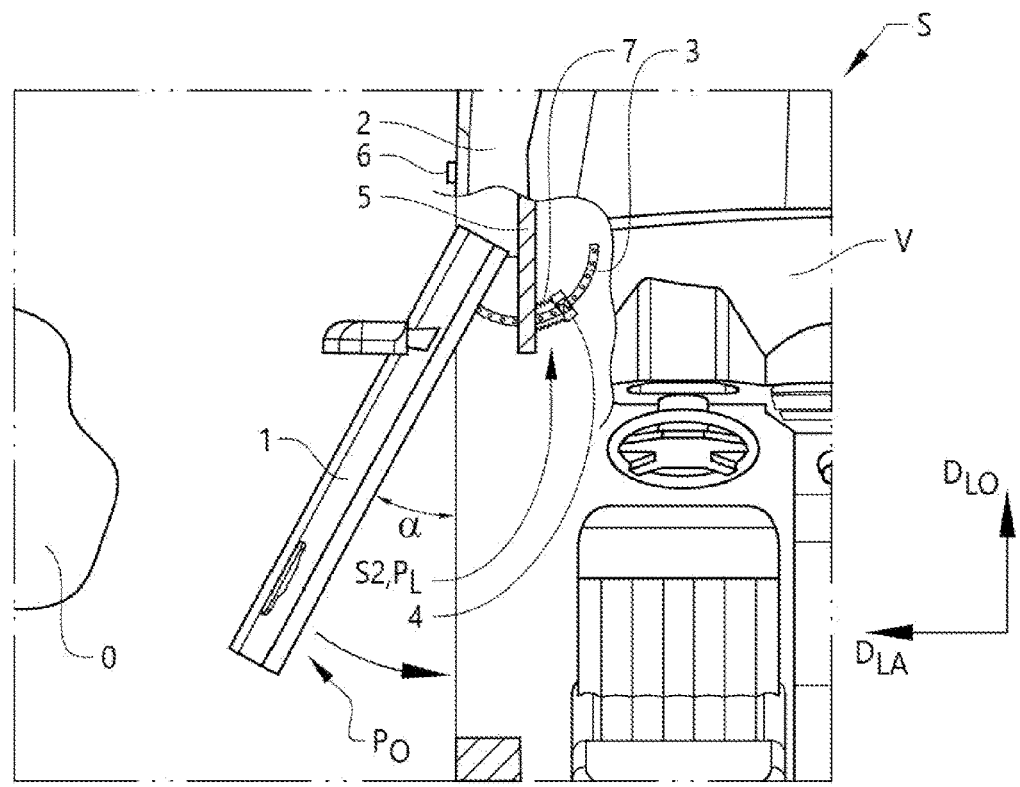
FIG. 6 shows schematically, in a view from above the vehicle with the vehicle door system in the second state with an open vehicle door, according to the disclosure.
Figure 9:
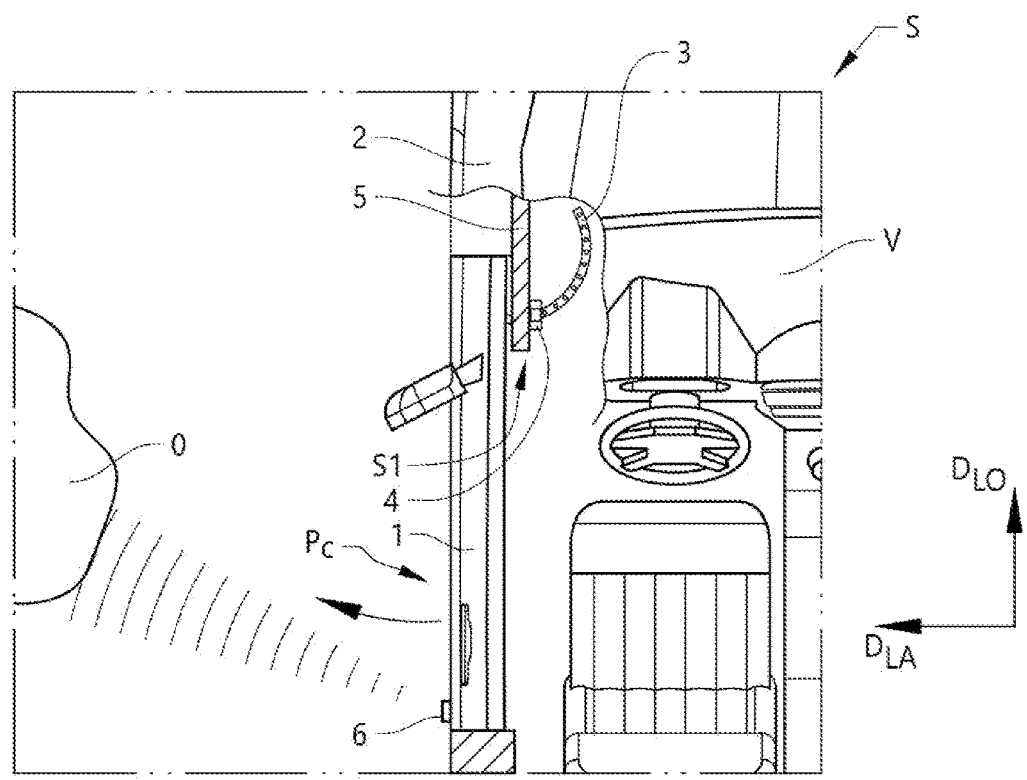
FIG. 9 shows schematically, in a view from above the vehicle with the vehicle door system in the first state with a closed vehicle door, according to an alternative embodiment of the disclosure.
Figure 10:
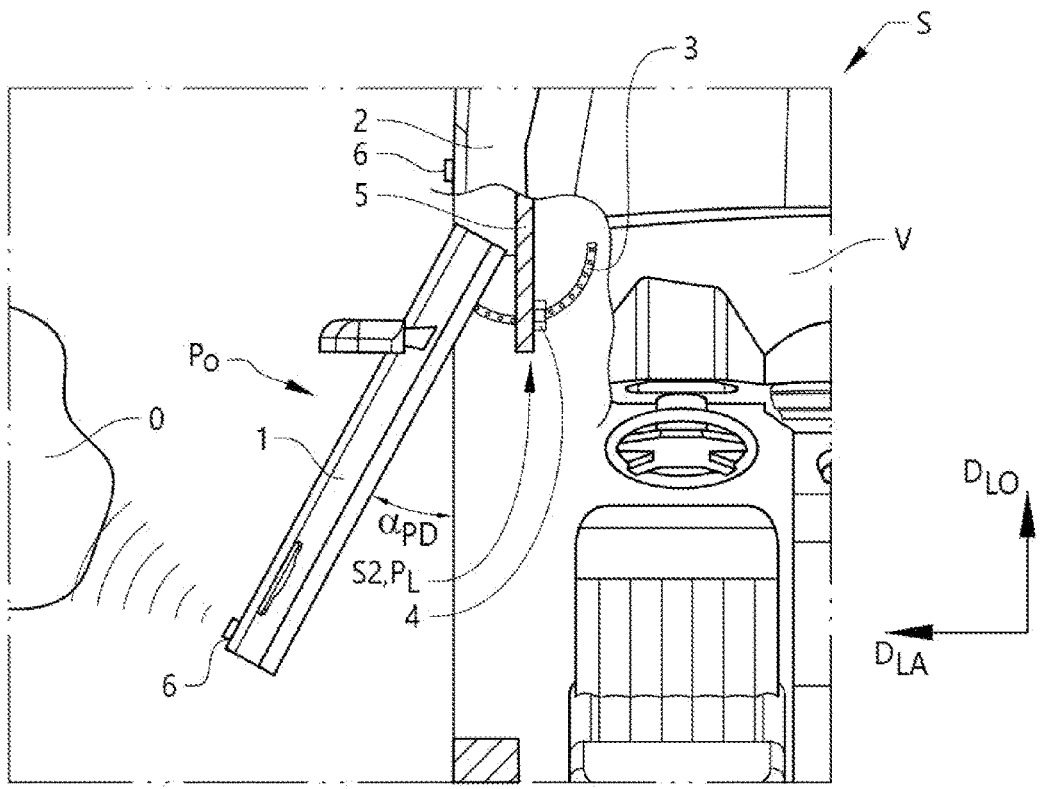
FIG. 10 shows schematically, in a view from above the vehicle with the vehicle door system in the second state with an open vehicle door, according to the alternative embodiment of the disclosure.

The vehicle door 1 is configured for being arranged in connection to the blocking member 5 in the closed door position $P_C$, as for example shown in FIGS. 4 and 9, and the vehicle door 1 is configured for being arranged at a distance from the blocking member 5 in the open door position $P_O$, as for example shown in FIGS. 5 and 10. The track 3 is configured to move with the vehicle door 1 when positioned between the closed door position $P_C$ and the open door position $P_O$.

The clamp unit 4 is movably arranged in relation to the track 3 and is further configured to move along the track 3 when the vehicle door 1 is displaced between the closed door position $P_C$ and open door position $P_O$, depending on the state of the system S, as will be further explained below. The clamp unit 4 may suitably be arranged to slide along the track 3. The clamp unit 4 comprises a body structure that is provided with a clamp opening 4a for the track 3, and the track 3 is arranged to run in the clamp opening 4a. The clamp opening 4a is thus configured for receiving the track 3, and the cross-sectional shape of the clamp opening 4a is substantially matching the cross-sectional shape of the track 3. In the illustrated embodiments, the clamp opening 4a has a slot-like shape. The body structure of the clamp unit 4 comprises a clamp contact surface 4c. The clamp unit 4 may for example be made of steel, aluminium, other metals or metallic materials, plastic materials, composite materials, or a combination of different materials.

The blocking member 5 is connected to the vehicle body structure 2, and may for example be arranged as an integrated part of the vehicle body structure 2 or arranged as a part attached to the vehicle body structure 2. In the illustrated embodiments, the blocking member 5 is arranged as a wall structure forming a part of the vehicle body structure 2, where the wall structure is arranged in connection to a vehicle door opening in a position adjacent the hinged connection between the vehicle door 1 and the vehicle body structure 2. The blocking member 5 may for example form a structural part of trim panel structures arranged in connection to the vehicle door opening, as indicated in FIG. 1. The blocking member 5 comprises a body structure with an opening 5a, as schematically indicated in FIG. 2, and the track 3 is extending through the opening 5a. The opening 5a of the blocking member 5 is thus configured for receiving the track 3, and the cross-sectional shape of the opening 5a is substantially matching the cross-sectional shape of the track 3. In the illustrated embodiments, the opening 5a has a slot-like shape. The body structure of the blocking member 5 comprises a contact surface 5b arranged on an inwardly facing side of the blocking member 5 in the lateral vehicle direction $D_{LA}$, as illustrated in FIGS. 1 and 2. The clamp contact surface 4c of the clamp unit 4 and the contact surface 5b of the blocking member 5 are arranged in a facing relationship and adapted for interacting with each other, when brought into contact with each other.

As illustrated in FIG. 1, the vehicle door 1 is arranged in the lateral vehicle direction $D_{LA}$ on an outer vehicle side SO in relation to the blocking member 5, and the clamp unit 4 is arranged in the lateral vehicle direction $D_{LA}$ on an inner vehicle side S1 in relation to the blocking member 5. The vehicle door 1 and the clamp unit 4 are thus arranged on opposite sides of the blocking member 5 in the lateral vehicle direction $D_{LA}$.

The clamp unit 4 is configured for being arranged in a first state S1 where the clamp unit 4 is allowed to move in relation to the track 3 and a second state S2 where the clamp unit 4 is prevented from moving in relation to the track 3. The first state S1 is schematically illustrated in FIGS. 4, 8, and 9. The second state S2 is schematically illustrated in FIGS. 5-7, and 10.

In the first state S1 when the vehicle door 1 is moved from the closed door position $P_C$ to the open door position $P_O$ the clamp unit 4 is configured for moving along the track 3. As schematically indicated in for example FIG. 1, the track 3 is moving outwards in the lateral vehicle direction $D_{LA}$ with the vehicle door 1 when opening the vehicle door 1 from the closed position $P_C$. The clamp unit 4 is in the first state S1 allowed to move in relation to the track 3, and therefore the clamp unit 4 is displaced in relation to the track 3 during opening of the vehicle door 1 due to the interaction between the clamp unit 4 and the blocking member 5, where the clamp contact surface 4c of the clamp unit 4 is interacting with the contact surface 5b of the blocking member 5. The blocking member 5 is through the interaction preventing the clamp unit 4 to move with the track 3 during the opening of the vehicle door 1, as shown in FIG. 1 where the clamp unit is arranged in close connection to the blocking member. Thus, in the first state S1 the clamp unit 4 is configured for being moved along the track 3 through interaction between the clamp unit 4 and the blocking member 5 when the vehicle door 1 is moved from the closed door position $P_C$ to the open door position $P_O$.

When the vehicle door 1 in the open door position $P_O$ is positioned in a predetermined opening angle position $\alpha_{PD}$, as schematically indicated in FIGS. 5 and 10, the clamp unit 4 is configured for being arranged in the second state S2 at a locked position $P_L$ in relation to the track 3. The locked position $P_L$ of the clamp unit 4 in the second state S2 is preventing further opening of the vehicle door 1 through interaction between the clamp unit 4 and the blocking member 5. In the locked position $P_L$, the clamp unit 4 is locked in position in relation to the track 3, and thus the clamp unit 4 is prevented from moving in relation to the track 3. When the clamp unit 4 is prevented from moving in relation to the track 3, the blocking member 5 is stopping further movement of the vehicle door 1 beyond the predetermined opening angle position ape, through the interaction between the clamp unit 4 and the blocking member 5. This could be understood from the position of the clamp unit 4 in relation to the blocking member 5 shown in FIG. 1. If the clamp unit 4 is arranged in the second state S2, the clamp unit 4 is preventing further opening of the vehicle door 1, since the blocking member 5 through the interaction with the clamp unit 4 is preventing further movement of the track 3 outwards in the lateral vehicle direction $D_{LA}$. In the second state S2, the vehicle door 1 is configured for being movable between the predetermined opening angle position are and the closed door position $P_C$. In this way, the vehicle door 1 may be arranged in any position between the closed door position $P_C$ and the predetermined opening angle position ape. It is thus possible to repeatedly displace the vehicle door 1 to any suitable position between the closed door position $P_C$ and the predetermined opening angle position ape, for example if there is a need to close the vehicle door 1 and thereafter open it again. The clamp unit 4 is thus limiting the opening angle α of the vehicle door 1 in the second state S2.

The vehicle door system S further comprises a detection unit 6 configured for determining the predetermined opening angle position ape based upon distance detection of adjacent objects O. In the embodiment illustrated in FIGS. 4-8, the detection unit 6 is arranged in an outer position of the vehicle body structure 2 in front of the vehicle door 1. It should however be understood that the detection unit 6 may have any suitable position on the vehicle body structure 2. In the alternative embodiment illustrated in FIGS. 9-10, the detection unit 6 is instead arranged on the outer side of the vehicle door 1, in a position close to an outer door edge in the open door position $P_O$. The detection unit 6 is arranged as a sensor unit for detecting the distances to the adjacent objects O, and based on the detected distances D the opening angle α of the vehicle door 1 can be calculated. The system may further comprise a suitable control unit connected to the detection unit 6 for determining the opening angle α. The predetermined opening angle position ape is determined as the opening angle α of the vehicle door 1 where the vehicle door 1 is prevented from hitting the adjacent objects O. The predetermined opening angle position ape is suitably determined for each vehicle door 1, such that the vehicle door 1 is allowed to be opened as much as possible with a safe distance between the open vehicle door 1 and the adjacent objects O.

The adjacent objects O may be of any type in close or immediate vicinity to the vehicle V, such as for example nearby-parked vehicles, lamp posts, barriers, or walls. The purpose of the vehicle door system S is thus to limit the opening angle α of the vehicle door 1 in order to prevent the door from hitting the adjacent objects O.

The detection unit 6 according to the different embodiments may be any suitable type of sensor or sensors, such as for example ultrasonic sensors, laser sensors, or LIDAR-type sensors, that is determining the distances to the adjacent objects O. A combination of different sensor types may be used if suitable. The vehicle V may for example be arranged with one sensor on each side of the vehicle V, as schematically indicated in FIGS. 4-10 where a left side of the vehicle is illustrated. Alternatively, the vehicle V is provided with a plurality of sensors that are providing distance information to the adjacent objects O. The control unit is used for collecting input from the sensors, and the detected distances D are used by the control unit to calculate the predetermined opening angle position an) of each vehicle door 1. The vehicle door system S is configured with information about the dimensions of the vehicle V, such as for example the outer boundaries of the vehicle V, the positions of the sensors, and further information about the opening geometry of the vehicle doors 1, in order to determine the predetermined opening angle position $\alpha_{PD}$ that is preventing the vehicle doors 1 arranged with the system S from hitting the adjacent objects O.

In the embodiment illustrated in FIG. 4-8, the detection unit 6 comprises distance sensors on each wing of the vehicle V, and the sensors are positioned between the front of the car and the A-pillar. The distance sensors may for example be mounted for measuring the clearance to the adjacent objects O at a height where the vehicle doors 1 are widest. Alternatively, the distance sensors may be sweeping-type sensors that are working in a sweeping motion upwards and downwards and/or backwards and forwards for detecting the distances to the adjacent objects O, for example in a vertical or essentially vertical sweeping pattern, a horizontal or essentially horizontal sweeping pattern, or a combination of vertical and horizontal sweeping patterns. As the vehicle V for example drives into a parking space, the distance sensors continuously measure the distance to the adjacent objects O. Wheel revolution data from for example the brake sensors may then be used by the control unit for generating a distance profile to the adjacent objects O on each side of the vehicle V. From the distance profile, the control unit can calculate the predetermined opening angle position an) of each vehicle door 1 that is provided with the system S. In the embodiment illustrated in FIGS. 9-10, the detection unit 6 comprises distance sensors attached to each front door of the vehicle V. The distance sensors in this embodiment may be used in the same way as described in the embodiment above, and in addition measure the distance to the adjacent objects O during the opening of the vehicle doors 1.

The distance information collected by the sensors in the different embodiments is used by the control unit for determining the locked position $P_L$ of the clamp unit 4 in relation to the track 3, which locked position $P_L$ in turn is determining the predetermined opening angle position $\alpha_{PD}$ of each vehicle door 1.

Figure 7:
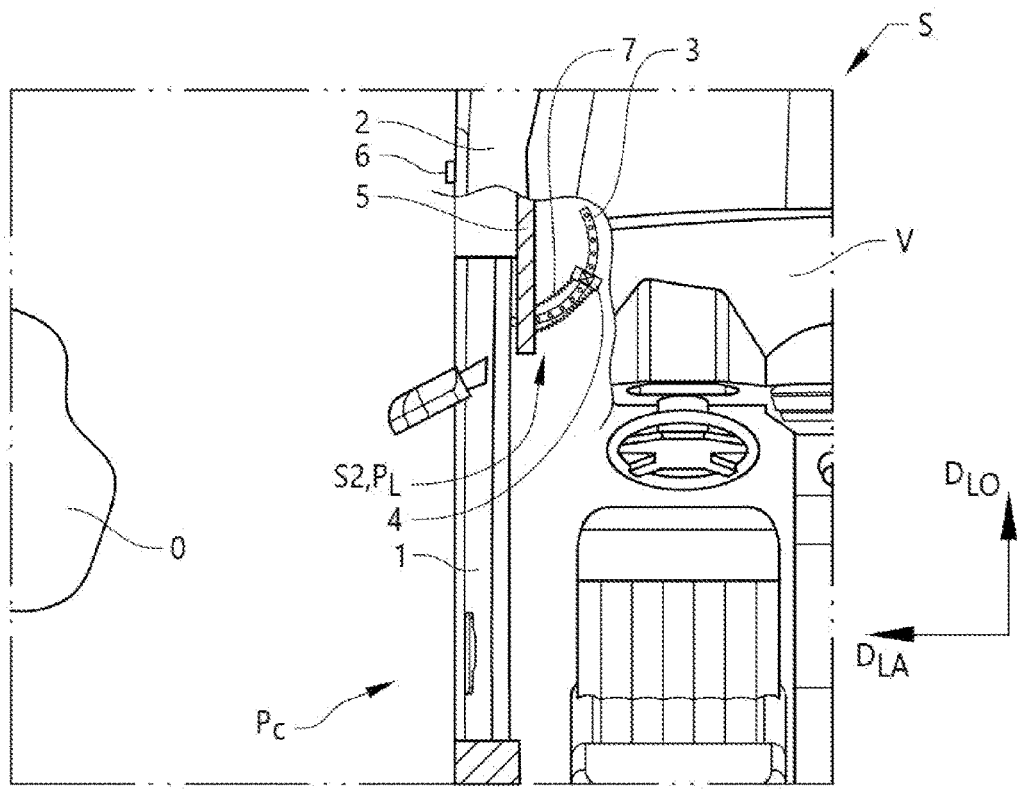
FIG. 7 shows schematically, in a view from above the vehicle with the vehicle door system in the second state with a closed vehicle door, according to the disclosure.
Figure 8:
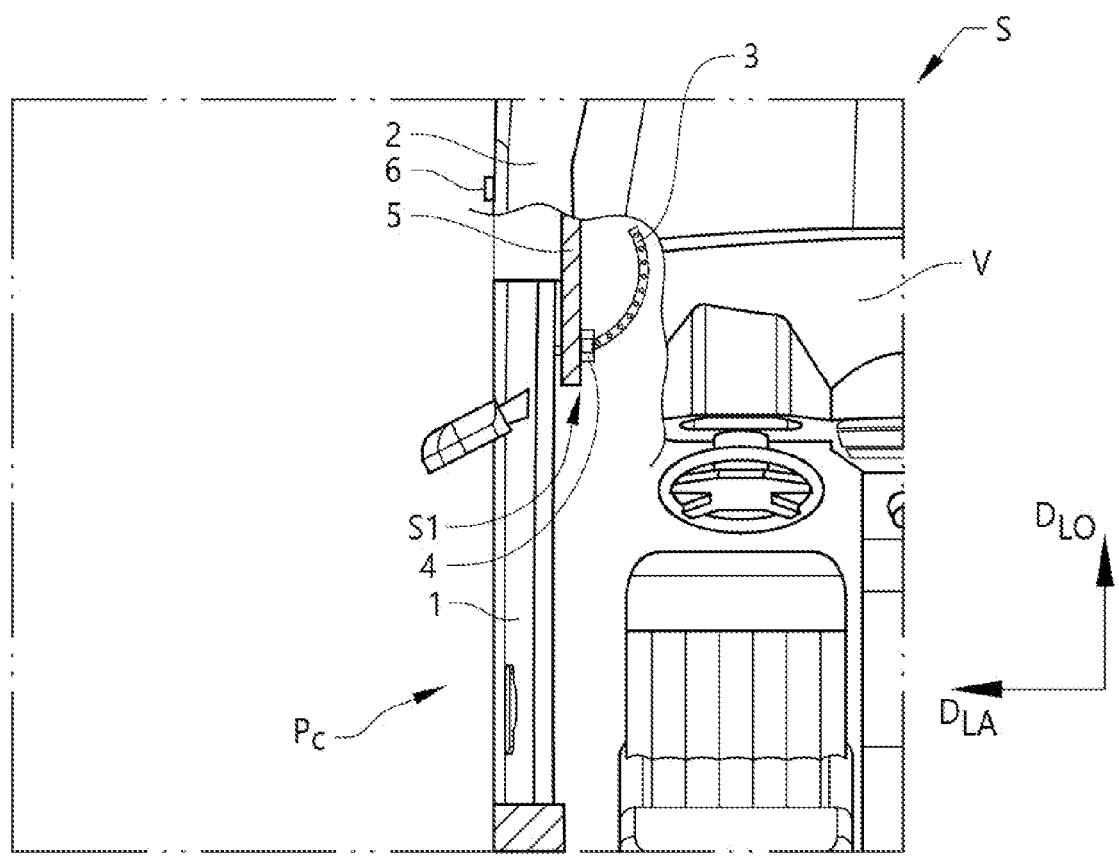
FIG. 8 shows schematically, in a view from above the vehicle with the vehicle door system in the first state with a closed vehicle door, according to the disclosure.

The system S further comprises a spring arrangement 7 connected to and arranged between the clamp unit 4 and the blocking member 5, as schematically shown in FIGS. 6 and 7. The spring arrangement 7 is positioning the clamp unit 4 in connection to the blocking member 5 in the first state S1. In the illustrated embodiment, the spring arrangement 7 comprises two extension springs that can pull the clamp unit 4 back towards the blocking member 5 when the clamp unit 4 is changed from the second state S2 to the first state S1. However, it should be understood that any suitable types and number of springs may be used. In the first state S1, where the clamp unit 4 is allowed to move in relation to the track 3 the spring arrangement 7 is holding the clamp unit 4 in connection to the blocking member 5 for a precise positioning of the clamp unit 4 in relation to the track 3, as shown in for example FIGS. 4-5, and 8-10. The spring arrangement 7 is further used for positioning the clamp unit 4 in connection to the blocking member 5 when the vehicle door system S is rearranged into the first state S1 from a locking engagement between the clamp unit 4 and the track 3 in the second state S2.

In the first state S1 the clamp unit 4 is being moved along the track 3 by the spring arrangement 7 when the vehicle door 1 is moved from the open door position $P_O$ to the closed door position $P_C$. The spring arrangement 7 is in this way positioning the clamp unit 4 in connection to the blocking member 5 in the first state S1 when the track 3 is moving with the vehicle door 1 in relation to the blocking member 5 when closing the vehicle door 5. The clamp member 4 is thus when closing the vehicle door 1 in the first state S1 displaced in relation to the track 3.

Figure 3A:
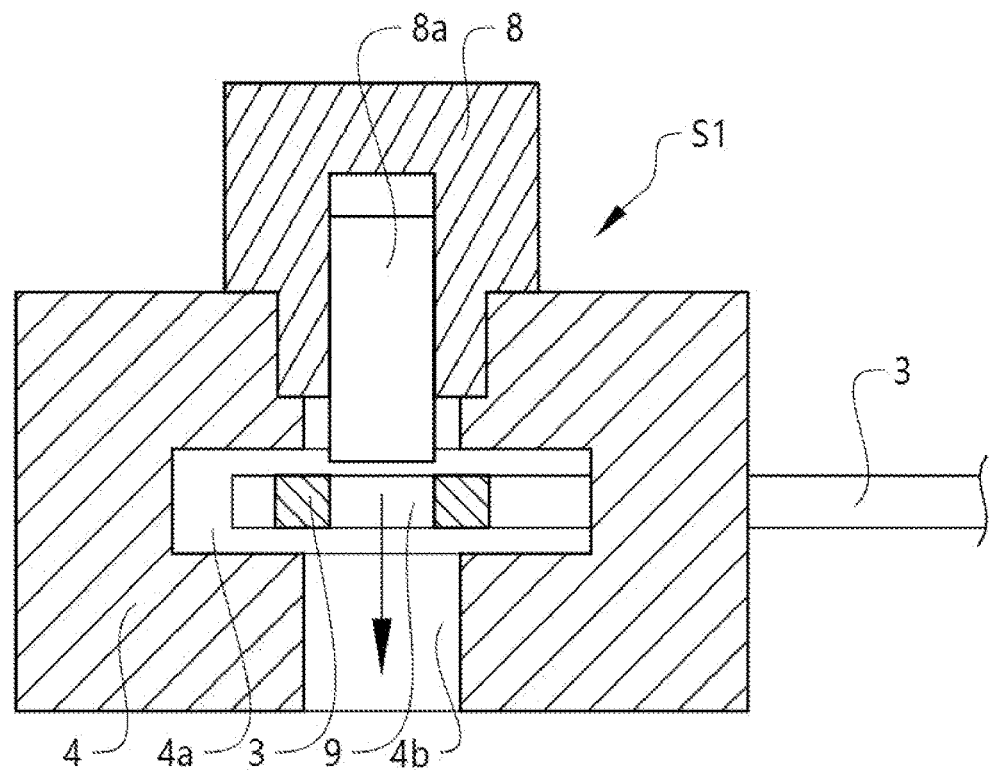
FIGS. 3A-3B show schematically, in cross-sectional views an actuator of the vehicle door system in a first state and in a second state, according to the disclosure.
Figure 3B:
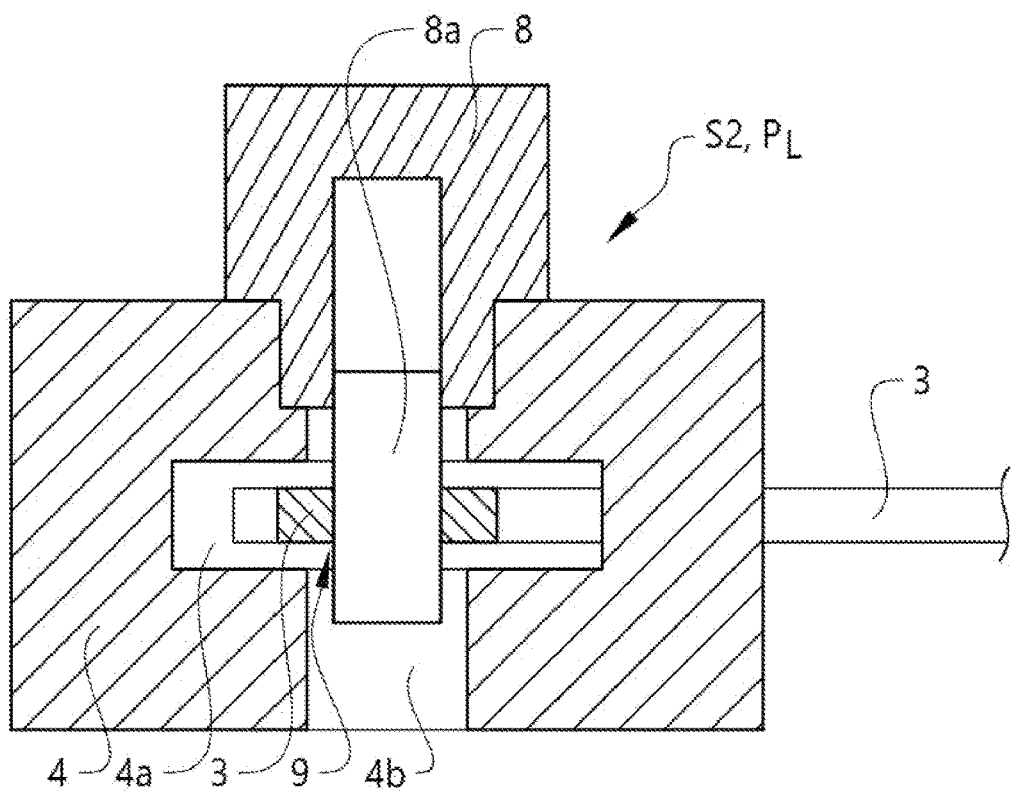

As illustrated in FIGS. 3A-3B, the clamp unit 4 comprises an actuator 8. The actuator 8 is configured for locking the clamp unit 4 to the track 3 in the second state S2, as shown in FIG. 3B, and allow movement of the clamp unit 4 in relation to the track 3 in the first state S1, as shown in FIG. 3A. The actuator 8 is locking the clamp unit 4 to the track 3 in a desired position when opening the vehicle door 1 for preventing further movement of the vehicle door 1 in order to avoid hitting the adjacent objects O. In the illustrated embodiment, the actuator 8 comprises a locking member 8a movably arranged in relation to the clamp unit 4. The track 3 comprises a plurality of locking openings 9. In the first state S1, the locking member 8a is not in engagement with the track 3, as shown in FIG. 3A. The locking member 8a is configured for being in locking engagement with one of the locking openings 9 in the second state S2, as shown in FIG. 3B. The locking member 8a is in the locked position $P_L$ extending through one of the locking openings 9 and further into a clamp channel 4b arranged in connection to the clamp opening 4a for a secure locking engagement between the clamp unit 4 and the track 3. The locking member 8a is designed for efficiently engaging one of the locking openings 9 of the track 3 in a desired position along the track 3, which position is depending on the predetermined opening angle position app. The plurality of locking openings 9 are allowing the clamp unit 4 to be arranged in different positions along the track 3 depending on the predetermined opening angle position $\alpha_{PD}$ of the vehicle door 1. The distance between the locking openings 9 may vary depending on the design and construction of the system S. The locking member 8a may be moved between the different positions with a solenoid, an electric motor, or other suitable actuating means. A Hall sensor, or other suitable positioning sensor, may be used for identifying the position of the locking openings 9 in relation to the locking member 8a for a correct positioning of the clamp unit 4 onto the track 3. The control unit may be used together with the positioning sensor for detecting or counting the locking openings 9 when opening the vehicle door from the closed door position $P_C$ for a precise and suitable locked position $P_L$ of the clamp unit 4.

The actuator 8 may have other configurations than the one described above. In an alternative non-illustrated embodiment, the track may be arranged with a plurality of grooves or teeth instead of the locking openings 9. The locking member 8a may then be arranged to cooperate with the grooves or teeth for positioning and locking the clamp unit 4 to the track 3. A Hall sensor, or other suitable positioning sensor, may be used for identifying the position of the grooves or teeth in relation to the locking member 8a for a correct positioning of the clamp unit 4 onto the track 3. The control unit may be used together with the positioning sensor for detecting or counting the grooves or teeth when opening the vehicle door from the closed door position $P_C$ for a precise and suitable locked position $P_L$ of the clamp unit 4.

In another non-illustrated alternative embodiment, the actuator 8 may instead be arranged with brake pads that are engaging the track 3 in the locked position $P_L$. With this configuration, the track 3 does not need locking openings, grooves or teeth, and is providing a stepless positioning of the clamp unit 4 in relation to the track 3.

The operation of the vehicle door system S for limiting the opening angle α of the vehicle door 1 is schematically illustrated in FIGS. 4-8. In FIG. 4, the vehicle V is parked and the vehicle door 1 is arranged in the closed position $P_C$. From the closed door position $P_C$, the vehicle door 1 may be opened by a user of the vehicle V through a swinging opening movement outwards in the lateral vehicle direction $D_{LA}$ as indicated with the arrow in the figure. The clamp unit 4 is arranged in the first state S1 where the clamp unit 4 is allowed to move in relation to the track 3. The detection unit 6 is detecting distances D from the vehicle V to the adjacent objects O, and the distance detection can be performed when the vehicle is V in the parked position or alternatively when the vehicle previously was driven to the parked position. The distance information from the detection unit 6 is stored and processed in for example the control unit for determining the predetermined opening angle position an) of the vehicle door 1, based upon the collected distance information by the detection unit 6. The predetermined opening angle position an) of the vehicle door 1 is determined as an opening position of the vehicle door 1, where the vehicle door 1 is prevented from hitting or contacting the adjacent objects O. In this way, the predetermined opening angle position an) of the vehicle door 1 is based on the detected distances D.

The vehicle door 1 is thereafter in the first state S1 being displaced from the closed door position $P_C$ to the open door position $P_O$. During the opening of the vehicle door 1, the track 1 is moved with the vehicle door 1 and the clamp unit 4 is displaced through a sliding movement along the track 3 by the interaction with the blocking member 5. In the first state S1, the clamp unit 4 is thus moved in relation to the track 3 through interaction between the clamp unit 4 and the blocking member 5 when the vehicle door 1 is moved from the closed door position $P_C$ to the open door position $P_O$. When the vehicle door 1 in the open door position $P_O$ is positioned in the predetermined opening angle position app, the clamp unit 4 is arranged in the second state S2 where the clamp unit 4 is prevented from moving in relation to the track 3 at the locked position $P_L$ of the clamp unit 4 in relation to the track 3, as illustrated in FIG. 5. In the second state S2, the clamp unit 4 is locked to the track 3 with the actuator 8. Further opening of the vehicle door 1 beyond the predetermined opening angle position an) is in the second state S2 prevented through interaction between the clamp unit 4 and the blocking member 5.

In FIG. 6, the clamp unit is shown in the second state S2, where the clamp unit 4 is in the locked position $P_L$ in relation to the track 3. In FIG. 6, the vehicle door 1 has been displaced from the position shown in FIG. 5 towards the vehicle body structure 2, for example by a door closing operation by the user, as indicated with the arrow. As shown in FIG. 6, the vehicle door 1 has an opening angle α that is smaller than the predetermined opening angle position $α_{PD}$ shown in FIG. 5. As described above, the system S further comprises the spring arrangement 7 connected to and arranged between the clamp unit 4 and the blocking member 5. When closing the vehicle door 1 from the predetermined opening angle position an), the springs of the spring arrangement 7 are being extended. From the position shown in FIG. 6, where the clamp unit 4 is in the second state S2, the vehicle door 1 can be displaced to any position between the predetermined opening angle position an) and the closed door position $P_C$.

In FIG. 7, the vehicle door has been displaced to the closed door position $P_C$ with the clamp unit 4 arranged in the second state S2. Since the clamp unit 4 is in the locked position $P_L$ in relation to the track 3, the springs of the spring arrangement 7 are being extended. From the position shown in FIG. 7, where the clamp unit 4 is in the second state S2, the vehicle door 1 can be displaced to any position between the predetermined opening angle position $α_{PD}$ and the closed door position $P_C$.

In FIG. 8, the clamp unit 4 has been disengaged from the locked position $P_L$ in relation to the track 3 and thus arranged back to the first state S1. The spring arrangement 7 has positioned the clamp unit 4 back to a position where the clamp unit 4 is arranged in connection to the blocking member 5 with the spring force from the extended springs. Thus, in the first state S1, the clamp unit 4 has with the spring arrangement 7 been arranged in connection to the blocking member 5. The clamp unit 4 has been moved in relation to the track 3 by the spring arrangement 7 when the vehicle door 1 is moved from the open door position $P_O$ as shown in FIG. 6 to the closed door position $P_C$ shown in FIG. 8. This is allowing the vehicle door system S to perform a new distance detection, as described above in relation to FIG. 4.

The alternative embodiment illustrated in FIGS. 9 and 10 has the same function as described in relation to FIGS. 4-8. The state of the system in FIG. 9 is corresponding to the state in FIG. 4, and the state of the system in FIG. 10 is corresponding to the state in FIG. 5. The only difference is the positioning of the detection unit 6.

It should be understood that if there are no adjacent objects O detected by the detection unit 6, there is no need to arrange the clamp unit in the second state S2.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the vehicle door system, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor or processors associated with the vehicle door system may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Vehicle door
2: Vehicle body structure
3: Track
4: Clamp unit
4a: Clamp opening
4b: Clamp channel
4c: Clamp contact surface
5: Blocking member
5a: Opening
5b: Contact surface
6: Detection unit
7: Spring arrangement
8: Actuator
8a: Locking member
9: Locking openings
D: Detected distances
$D_{LA}$: Lateral vehicle direction
$D_{LO}$: Longitudinal vehicle direction
O: Adjacent object
$P_C$: Closed door position
$P_L$: Locked position
$P_O$: Open door position
S: Vehicle door system
S1: First state
S2: Second state
V: Vehicle
α Opening angle
$α_{PD}$: Predetermined opening angle position

What is claimed is:

1. A vehicle door system for limiting an opening angle of a vehicle door, wherein the vehicle door is attached to and movably arranged in relation to a vehicle body structure between a closed door position and an open door position, wherein the system comprises a track connected to the vehicle door, a clamp unit connected to and movably arranged in relation to the track, a blocking member directly connected to the vehicle body structure, and a spring arrangement connected to and arranged between the clamp unit and the blocking member, wherein the track is extending through the blocking member,
  wherein the clamp unit is configured for being arranged in a first state where the clamp unit is allowed to move in relation to the track and a second state where the clamp unit is prevented from moving in relation to the track,
  wherein in the first state when the vehicle door is moved from the closed door position to the open door position, the clamp unit is configured for moving along the track through interaction between the clamp unit and the blocking member,
  wherein when the vehicle door in the open door position is positioned in a predetermined opening angle position, the clamp unit is configured for being arranged in the second state at a locked position in relation to the track preventing further opening of the vehicle door through interaction between the clamp unit and the blocking member,
  wherein in the second state, the vehicle door is configured for being movable between the predetermined opening angle position and the closed door position, and
  wherein the spring arrangement positions the clamp unit in connection to the blocking member in the first state.

2. The vehicle door system according to claim 1, wherein the system further comprises a detection unit configured for determining the predetermined opening angle position based upon distance detection of adjacent objects.

3. The vehicle door system according to claim 1, wherein the vehicle door is arranged in a lateral vehicle direction on an outer vehicle side in relation to the blocking member, and the clamp unit is arranged in the lateral vehicle direction on an inner vehicle side in relation to the blocking member, wherein the vehicle door and the clamp unit are arranged on opposite sides of the blocking member in the lateral vehicle direction.

4. The vehicle door system according to claim 1, wherein the blocking member comprises an opening, wherein the track is configured for extending through the opening.

5. The vehicle door system according to claim 1, wherein in the first state the clamp unit is configured for being moved along the track by the spring arrangement when the vehicle door is moved from the open door position to the closed door position.

6. The vehicle door system according to claim 1, wherein the clamp unit comprises an actuator, wherein the actuator is configured for locking the clamp unit to the track.

7. The vehicle door system according to claim 6, wherein the actuator comprises a movably arranged locking member and the track comprises a plurality of locking openings, wherein the locking member is configured for being in locking engagement with one of the locking openings in the second state.

8. The vehicle door system according to claim 1, wherein the vehicle door is configured for being arranged in connection to the blocking member in the closed door position and arranged at a distance from the blocking member in the open door position, and wherein the track is configured to move with the vehicle door when positioned between the closed door position and the open door position.

9. The vehicle door system according to claim 1, wherein the track has a curved configuration.

10. A vehicle, wherein the vehicle comprises a vehicle door system according to claim 1.

11. A method for operating a vehicle door system of a vehicle for limiting an opening angle of a vehicle door, wherein the vehicle door is attached to and movably arranged in relation to a vehicle body structure of the vehicle between a closed door position and an open door position, wherein the system comprises a track connected to the vehicle door, a clamp unit connected to and movably arranged in relation to the track, a blocking member directly connected to the vehicle body structure, and a spring arrangement connected to and arranged between the clamp unit and the blocking member, wherein the track is extending through the blocking member, wherein the method comprises the steps:

arranging the clamp unit in a first state where the clamp unit is allowed to move in relation to the track;

positioning the clamp unit in connection to the blocking member in the first state with the spring arrangement, and moving the clamp unit in relation to the track in the first state by the spring arrangement when the vehicle door is moved from the open door position to the closed door position;

moving the vehicle door when the clamp unit is arranged in the first state from the closed door position to the open door position, wherein during movement of the vehicle door the clamp unit is moving along the track through interaction between the clamp unit and the blocking member;

arranging the clamp unit in a second state where the clamp unit is prevented from moving in relation to the track at a locked position of the clamp unit in relation to the track, when the vehicle door in the open door position is positioned in a predetermined opening angle position, wherein further opening of the vehicle door is prevented through interaction between the clamp unit and the blocking member, and when in the second state, moving the vehicle door between the predetermined opening angle position and the closed door position.

12. The method according to claim 11, wherein the system further comprises a detection unit, wherein the method further comprises the steps: detecting distances from the vehicle to adjacent objects with the detection unit; and based on the detected distances determining the predetermined opening angle position.

13. The method according to claim 11, wherein the clamp unit comprises an actuator, wherein the method further comprises the step: locking the clamp unit to the track with the actuator in the second state.

14. The vehicle door system according to claim 1, wherein the spring arrangement includes one or more extension springs.

* * * * *